US010551494B2

(12) United States Patent
Hirai et al.

(10) Patent No.: US 10,551,494 B2
(45) Date of Patent: Feb. 4, 2020

(54) ROAD INFORMATION DETECTION APPARATUS AND ROAD INFORMATION DETECTION METHOD

(71) Applicant: Panasonic Intellectual Property Management Co., Ltd., Osaka (JP)

(72) Inventors: Yoshito Hirai, Kanagawa (JP); Tomohiro Yui, Kanagawa (JP); Hidekuni Yomo, Kanagawa (JP); Hirohito Mukai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 265 days.

(21) Appl. No.: 15/786,081

(22) Filed: Oct. 17, 2017

(65) Prior Publication Data

US 2018/0052230 A1 Feb. 22, 2018

Related U.S. Application Data

(63) Continuation of application No. PCT/JP2016/002320, filed on May 12, 2016.

(30) Foreign Application Priority Data

May 22, 2015 (JP) ................................. 2015-104750

(51) Int. Cl.
*G01S 13/93* (2006.01)
*G01S 7/41* (2006.01)
(Continued)

(52) U.S. Cl.
CPC ............ *G01S 13/931* (2013.01); *G01S 7/411* (2013.01); *G01S 13/426* (2013.01); *G01S 17/89* (2013.01);
(Continued)

(58) Field of Classification Search
CPC ........ G08G 1/166; G08G 1/163; G08G 1/015; G08G 1/09623; G08G 1/096783;
(Continued)

(56) References Cited

U.S. PATENT DOCUMENTS 9,322,905 B2* 4/2016 Kishigami ............. G01S 13/91
2002/0190895 A1 12/2002 Nakanishi et al.
(Continued)

FOREIGN PATENT DOCUMENTS

EP 982699 A2 3/2000
JP 1-111400 U 7/1989
(Continued)

OTHER PUBLICATIONS

Communication pursuant to Article 94(3) EPC dated Dec. 13, 2018 for the related European Patent Application No. 16799526.5.
(Continued)

*Primary Examiner* — Olumide Ajibade Akonai
(74) *Attorney, Agent, or Firm* — Seed IP Law Group LLP

(57) ABSTRACT

A road information detector acquires road information by emitting a beam via a variable directivity transmission antenna to a road sign having plural flat portions and includes a transceiver that controls the antenna to scan the beam by switching an emission angle including an azimuth angle relative to the front direction of a vehicle and receives, as reflected wave signals, waves reflected by the flat portions, a distance and reflected wave intensity detector that detects a distance between the vehicle and each of the flat portions and a reflected wave intensity of each of the reflected waves, an emission angle detector that detects the emission angle based on the reflected wave signal, and a road information analyzer that acquires the road information by generating a heat map based on the emission angles,
(Continued)

distances, and reflected wave intensities and analyzing the heat map using a threshold value of the wave intensity.

11 Claims, 11 Drawing Sheets

(51) Int. Cl.
    *G01S 13/42*     (2006.01)
    *G08G 1/16*     (2006.01)
    *G01S 17/93*     (2006.01)
    *G01S 17/89*     (2006.01)
    *G05D 1/02*     (2006.01)

(52) U.S. Cl.
    CPC ..... *G01S 17/936* (2013.01); *G01S 2013/9357* (2013.01); *G05D 1/0257* (2013.01); *G08G 1/166* (2013.01)

(58) Field of Classification Search
    CPC . G08G 1/0116; G08G 1/165; B60W 2420/52; B60W 2550/22; B60W 2550/143; G01S 17/936; G01S 17/42; G01S 17/89; G01S 17/10; G01S 7/4817; G01S 17/023; G01S 13/931; G01S 2013/9375; G01S 13/865; G01S 17/026; G01S 7/4808; G01S 13/89; G01S 13/91; G01S 2013/0245; G01S 2007/403; G01S 2007/4091; G01S 7/411; G01S 2007/4034; G01S 13/60; G01S 13/936; G01S 13/426; G01S 13/584
    See application file for complete search history.

(56) References Cited

U.S. PATENT DOCUMENTS

| | | | |
|---|---|---|---|
| 2003/0174054 A1* | 9/2003 | Shimomura | G01S 7/415 340/435 |
| 2005/0116854 A1* | 6/2005 | Beez | G01S 7/4026 342/70 |
| 2009/0027180 A1* | 1/2009 | Shibata | G01S 7/41 340/435 |
| 2013/0222175 A1* | 8/2013 | Smith | G08G 1/09623 342/70 |
| 2014/0156178 A1* | 6/2014 | Yoo | G01C 21/32 701/409 |
| 2014/0297092 A1* | 10/2014 | Delp | G05D 1/0212 701/25 |

FOREIGN PATENT DOCUMENTS

| | | |
|---|---|---|
| JP | 2000-067375 A | 3/2000 |
| JP | 2005-025497 A | 1/2005 |

OTHER PUBLICATIONS

International Search Report of PCT application No. PCT/JP2016/002320 dated Jul. 19, 2016.

\* cited by examiner

ROAD INFORMATION DETECTION APPARATUS AND ROAD INFORMATION DETECTION METHOD

BACKGROUND

1. Technical Field

The present disclosure relates to a road information detection apparatus and, in particular, to a road information detection apparatus capable of acquiring road information on the basis of the reflected wave intensity of a beam.

2. Description of the Related Art

Conventionally, road information has been acquired by a driver of a vehicle by visually checking a road sign or the like. However, since the driver visually identifies the road signs, only the driver can control the car. Therefore, the road signs cannot be directly used as data for controlling the travel of the vehicle, which is problematic. To solve such a problem, in recent years, various techniques have been developed to enable vehicles to travel more safely and comfortably.

For example, Japanese Unexamined Utility Model Application Publication No. 1-111400 describes a method for acquiring road information by using a receiver attached to a vehicle. The receiver receives road information data transmitted from a road sign through wireless communication. In addition, Japanese Unexamined Patent Application Publication No. 2000-67375 describes a method for acquiring road information associated with a bar code. In the method, a camera mounted in a vehicle recognizes the image of the bar code formed on a road surface or a side wall surface of a road. These methods can be applied in the future to an automated driving technique in which an occupant in a vehicle simply inputs the destination to the vehicle so that the vehicle automatically travels to the destination.

SUMMARY

However, according to the method described in Japanese Unexamined Utility Model Application Publication No. 1-111400, a unit for transmitting road information data is required. Therefore, to apply the method to the major roads nationwide, a great deal of time and expense is required, which is problematic. In addition, according to the method described in Japanese Unexamined Patent Application Publication No. 2000-67375, since the in-vehicle camera recognizes a bar code associated with the road information, the bar code is not correctly recognized in the case of nighttime, rainy weather, fog, or the like, which is problematic. Furthermore, if a bar code is used as a road sign, the size of the road sign increases, resulting in deterioration of the landscape.

One non-limiting and exemplary embodiment provides a road information detection apparatus and a road information detection method that solve these problems and that are capable of acquiring road information highly accurately regardless of the weather conditions and time of day.

In one general aspect, the techniques disclosed here feature a road information detection apparatus that acquires road information by emitting a beam via a transmission antenna having a variable directivity pattern from a measuring position to a road sign having a plurality of flat portions. Each of the plurality of flat portions is one of a first flat portion in a direction normal to which the beam from the measuring position is incident and a second flat portion in a direction other than normal to which the beam from the measuring position is incident. The road information detection apparatus includes a transceiver circuit that controls the transmission antenna to scan the beam by switching an emission angle which includes an azimuth angle relative to the front direction of a vehicle and receives, as reflected wave signals, reflected waves produced when the beam is reflected by the plurality of flat portions, a distance and reflected wave intensity detection unit that detects a distance between the vehicle and each of the flat portions and a reflected wave intensity of each of the reflected waves reflected by the flat portions, an emission angle detection unit that detects the emission angle of each of the beams on the basis of the reflected wave signal, and a road information analysis unit that acquires the road information by generating a heat map on the basis of each of the emission angles, each of the distances, and the reflected wave intensity of each of the reflected waves and analyzing the heat map by using a threshold value of the reflected wave intensity.

According to the present disclosure, the road information detection apparatus can acquire road information on the basis of the reflected wave intensity of the beam. As a result, the road information detection apparatus can acquire the road information highly accurately regardless of weather conditions and time of day.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
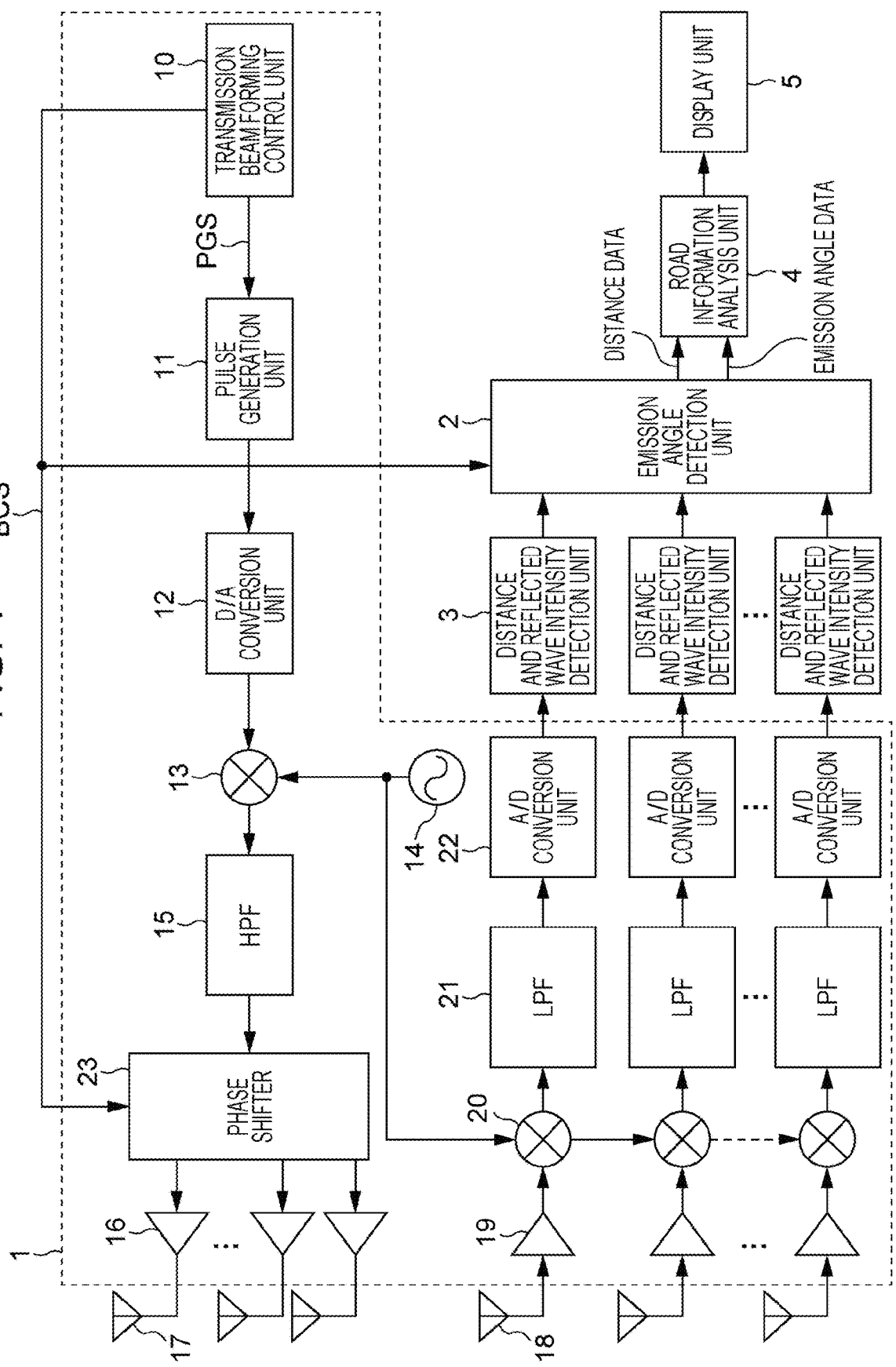
FIG. 1 is a block diagram of an example of the configuration of a road information detection apparatus according to a first embodiment of the present disclosure.

Embodiments of the present disclosure are described below with reference to the accompanying drawings. Note that throughout the following embodiments, the same constituent elements are denoted by the same reference numerals, and description of the same constituent elements is not repeated.

According to the present disclosure, a road sign including a side wall or a signboard is formed from a plurality of flat portions, and each of the flat portions reflects a beam. Here, when a beam is incident on each of the flat portions in a direction normal to the flat portion, the reflected wave intensity of a wave reflected by the flat portion is high. In contrast, when a beam is incident in a direction other than the direction normal to the flat portion, the reflected wave intensity of a wave reflected by the flat portion is low. The beams are incident on the flat portions at various angles and the reflected wave intensities of the reflected waves reflected by the flat portion are detected. In this manner, the road information indicated by the road sign is read out. The present disclosure is described in detail below.

First Embodiment

FIG. 1 is a block diagram of an example of the configuration of a road information detection apparatus according to a first embodiment of the present disclosure. As illustrated in FIG. 1, the road information detection apparatus includes a transceiver circuit 1 attached to the left end of the front portion of a vehicle, an emission angle detection unit 2, a distance and reflected wave intensity detection unit 3, a road information analysis unit 4, and a display unit 5. The road information detection apparatus acquires road information by emitting beams to a road sign having a plurality of flat portions. In addition, the flat portions are inclined with respect to an imaginary plane orthogonal to the vehicle travel direction such that the beams emitted from the transceiver circuit 1 are incident on the flat portions at a variety of angles. Here, in a flat portion (a first flat portion) having an inclination such that the beam emitted from the transceiver circuit 1 is incident on the flat portion from the normal direction, the intensity of the wave reflected by the flat portion is high. In contrast, in a flat portion (a second flat portion) having an inclination such that the beam emitted from the transceiver circuit 1 is incident on the flat portion from a direction other than the normal direction, the intensity of the reflected wave is low.

The transceiver circuit 1 includes a transmission beam forming control unit 10, a pulse generation unit 11, a D/A conversion unit 12, a multiplier 13, a local oscillator 14, a high-pass filter (HPF) 15, transmission amplifiers 16, each of which serves as an amplifier unit, transmission antennas 17, reception antennas 18, reception amplifiers 19, each of which serves as an amplifier unit, multipliers 20, low-pass filters (LPFs) 21, A/D conversion units 22, and a phase shifter 23. The transceiver circuit 1 controls the transmission antennas 17 by switching the emission angle which includes the azimuth angle relative to the front direction of the vehicle so as to scan a beam (a radio signal) and receives the waves of the beams (radio signals) reflected by the flat portions as reflected wave signals.

The transmission beam forming control unit 10 generates a beam control signal BCS for controlling the directivity of the transmission antenna 17 and transmits the generated beam control signal BCS to the phase shifter 23. The beam control signal BCS controls the beam transmission operation performed by the transceiver circuit 1. The scanned beam (the radio signal) is, for example, a radar wave. The radar wave is an electromagnetic wave having a frequency in the millimeter wave band, such as a frequency band of 76 GHz to 81 GHz. Note that in addition to the millimeter wave radar, the transceiver circuit 1 may consist of, for example, LiDAR or a sonar. The transceiver circuit 1 scans the beam by switching the emission angle having the azimuth angle and receives the reflected wave reflected by the plurality of flat portions as a reflected wave signal. In addition, the transmission beam forming control unit 10 generates a pulse generation signal PGS used to generate a modulation signal (for example, a PAM (pulse amplitude modulation) signal) for performing a predetermined encoding process on the baseband signal. Thereafter, the transmission beam forming control unit 10 transmits the generated pulse generation signal PGS to the pulse generation unit 11. The pulse generation unit 11 generates the modulation signal on the basis of the pulse generation signal PGS and outputs the generated modulation signal to the D/A conversion unit 12. The D/A conversion unit 12 converts the modulation signal into an analog signal, which serves as a baseband signal, and outputs the baseband signal (the analog signal) to the multiplier 13. The multiplier 13 multiplies the baseband signal received from the D/A conversion unit 12 by a local signal of a predetermined frequency generated by the local oscillator 14. Thus, the multiplier 13 generates a multiplication result signal and outputs the generated multiplication result signal to the HPF 15. The HPF 15 performs a high-pass filtering process on the multiplication result signal received from the multiplier 13. Thus, the HPF 15 generates a radio signal and outputs the generated radio signal to the transmission amplifier 16 via the phase shifter 23. The transmission amplifier 16 amplifies the voltage level of the radio signal to a predetermined voltage level and outputs the amplified radio signal to the transmission antenna 17.

The transmission beam forming control unit 10 controls the phase shifter 23 on the basis of the beam control signal BCS so that a beam (a radio signal) is emitted from the transmission antenna 17 in a predetermined azimuth angle direction. The transmission beam forming control unit 10 controls the phase shifter 23 on the basis of the beam control signal BCS such that the transmission antenna 17 transmits a beam in a direction of a predetermined azimuth angle varying counterclockwise from a vehicle travel direction A0 in increments of a predetermined angular unit. As used herein, the term "azimuth angle" refers to an angle of rotation counterclockwise from the vehicle travel direction A0 (refer to FIG. 2).

The transmission antenna 17 is an antenna capable of electrically switching the emission direction of the beam. For example, the transmission antenna 17 is a variable directivity antenna including, for example, a phased array antenna. The transmission antenna 17 scans the beam by switching the emission direction of the beam on the basis of the beam control signal BCS.

The reception antenna 18 receives the reflected wave signal of the beam emitted from the transmission antenna 17 and outputs the received reflected wave signal to the reception amplifier 19. The reception amplifier 19 amplifies the voltage level of the reflected wave signal received by the reception antenna 18 to a predetermined voltage level and outputs the amplified reception signal to the multiplier 20. The multiplier 20 multiplies the reception signal by the above-mentioned local signal to generate a multiplication result signal and outputs the generated multiplication result signal to the LPF 21. The LPF 21 performs low-pass filtering processing on the multiplication result signal received from the multiplier 20. Thus, LPF 21 demodulates the multiplication result signal into a baseband signal and outputs the demodulated baseband signal to the A/D conversion unit 22. The A/D conversion unit 22 converts the baseband signal into a digital signal and outputs the digitally converted baseband signal to the emission angle detection unit 2 and the distance and reflected wave intensity detection unit 3.

By using the digitally converted baseband signal, the distance and reflected wave intensity detection unit 3 detects the distance between the vehicle and each of the flat portions and the intensity of the reflected wave that is reflected by each of the flat portions and outputs the distances and the reflected wave intensities to the emission angle detection unit 2. The distance and reflected wave intensity detection unit 3 calculates a length of time after the transmission antenna 17 emits the beam until the reception antenna 18 receives a reflected wave that is reflected by each of the flat portions with a reflectance of the predetermined value or greater. In this manner, the distance and reflected wave intensity detection unit 3 detects the distance between the vehicle and each of the flat portions. In addition, the emission angle detection unit 2 estimates the arrival direction of the reflected wave signal on the basis of the phase differences among the reflected wave signals (the digital converted baseband signals) received by the reception antennas 18. By using the phase differences among the reflected wave signals and the beam control signal BCS, the emission angle detection unit 2 outputs, to the road information analysis unit 4, the data of the azimuth angle of the beam (the reflected wave) as the azimuth angle at which the flat portion that strongly reflects the beam is located. Examples of an arrival direction estimation method includes the beam former method and the Capon method. In addition, the emission angle detection unit 2 outputs, to the road information analysis unit 4, the data of the distances and the reflection wave intensities acquired from the distance and the reflected wave intensity detection unit 3.

On the basis of the azimuth angle detected by the emission angle detection unit 2 and the distance between the vehicle and each of the flat portions and the reflected wave intensity detected by the reflected wave intensity detection unit 3, the road information analysis unit 4 generates a heat map and analyzes the generated heat map by using a threshold value of the reflected wave intensity. In this manner, the road information analysis unit 4 acquires the road information. The display unit 5 displays the road information input from the road information analysis unit 4.

The operation performed by the road information detection apparatus having the above-described configuration is described below.

Figure 2:
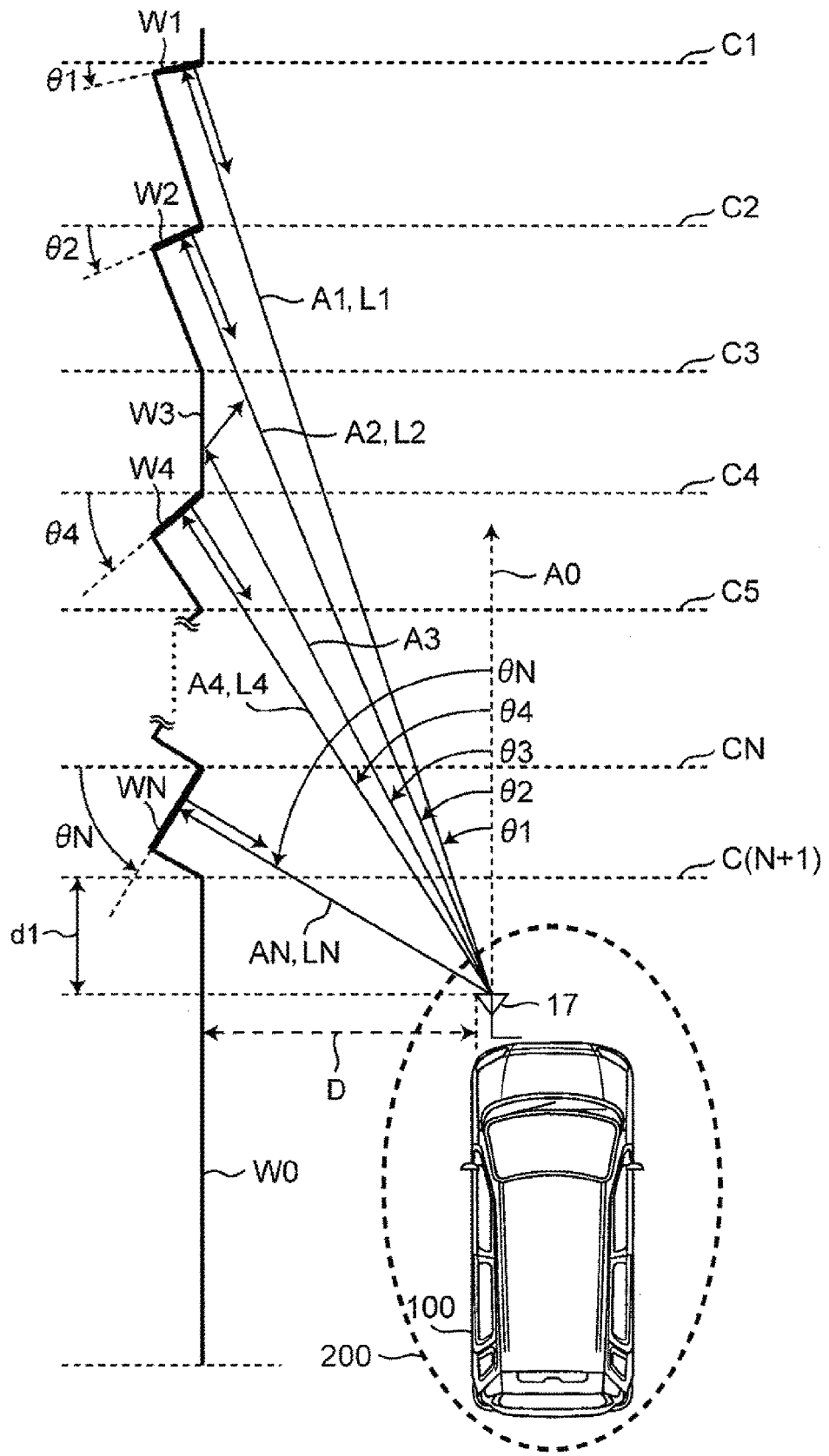
FIG. 2 is a schematic illustration of the operation performed by the road information detection apparatus illustrated in FIG. 1 according to the first embodiment of the present disclosure.

FIG. 2 is a schematic illustration of the operation performed by the road information detection apparatus illustrated in FIG. 1. In FIG. 2, a road sign (a side wall) indicating road information in the form of a plurality (N bits) of digital data is illustrated. That is, the road sign consists of N flat portions W1 to WN. The flat portion furthest away from the vehicle 100 is the flat portion W1, and the flat portions W2, W3, W4, . . . , WN are formed as the road sign approaches the vehicle 100 from the flat portion W1. For example, the interval between the flat portions Wn (n=1, 2, 3, 4, . . . , N) may be zero or a predetermined interval.

When the vehicle 100 scans a beam over the road sign at the measuring position 200, the flat portion W0 is positioned parallel to the vehicle travel direction A0. A distance D is the distance from the transmission antenna 17 to the flat portion W0. Imaginary planes Cn (n=1, 2, 3, 4, . . . , N, N+1) each positioned so as to extend in a direction perpendicular to the vehicle travel direction A0 are parallel to one another at predetermined intervals. The road sign has N flat portions Wn between the imaginary plane C(N+1) located away from the transmission antenna 17 by a distance d1 and the imaginary plane C1. Each of the flat portions Wn extends from the intersecting point of the extended line of the flat portion W0 and the imaginary plane Cn so as to be inclined at a predetermined rotation angle in the counterclockwise direction from the imaginary plane Cn (described in more detail below). In the case where there is a gap between the flat portions Wn, by providing a connecting portion in each of the gaps, the road sign is integrally formed from the flat portion W1 to the flat portion W0. For example, a connecting portion is provided in a gap between the flat portion W1 and the flat portion W2 and in a gap between the flat portion W2 and the flat portion W3.

The transceiver circuit 1 controls the transmission antenna 17 to emit a beam at angular increments of θd between 0° and 90° relative to the vehicle travel direction A0. That is, the transceiver circuit 1 controls the transmission antenna 17 to emit a beam at an emission angle which includes an azimuth angle θn (n=1, 2, 3, 4, . . . , N) which is an angle of rotation in the counterclockwise direction from the vehicle travel direction A0. The azimuth angle θn (0 degrees<θn<90 degrees) is calculated by the following equation (1):

$$\theta n = \theta 1 + (n-1) \times \theta d \quad (1).$$

As illustrated in FIG. 2, the flat portions W1, W2, W4, . . . , WN are inclined with respect to the imaginary planes C1, C2, C4, CN, . . . , respectively, such that the reflected waves from the flat portions W1, W2, W4, . . . , WN are reflected with a reflectance of the predetermined value or greater. For example, the flat portions W1, W2, W4, . . . , WN are inclined with respect to the imaginary planes C1, C2, C4, . . . , CN at rotation angles the same as the azimuth angles θ1, θ2, θ4, . . . , θN, respectively, such that the beams emitted from the vehicle 100 are incident on the flat portions W1, W2, W4, . . . , WN from the normal direction. In contrast, the flat portion W3 is inclined with respect to the imaginary plane C3 such that the reflected wave from the flat portion W3 is reflected with a reflectance lower than the predetermined reflectance. For example, the flat portion W3 is inclined at a rotation angle of 90 degrees with respect to the imaginary plane C3 such that the beam emitted from the vehicle 100 is incident on the flat portion W3 from a direction other than the normal direction.

An electromagnetic wave reflecting material, such as a metal, is formed on the surface of each of the flat portions Wn. If the reflected wave intensity of the beam that is reflected by the flat portion is higher than or equal to the threshold value, the road information analysis unit 4 generates digital data of a first value (for example, digital data of "1"). However, if the reflected wave intensity is lower than the threshold value, the road information analysis unit 4 generates digital data of a second value (for example, digital data of "0"). Here, when the beam emitted from the vehicle 100 is incident on the flat portion (the first flat portion) from the normal direction, the intensity of the reflected wave reflected by the flat portion is higher than or equal to the threshold value. In contrast, when the beam emitted from the vehicle 100 is incident on the flat portion (the second flat portion) in a direction other than the normal direction, the intensity of the reflected wave reflected by the flat portion is lower than the threshold value.

The beam emitted from the transmission antenna 17 at the azimuth angle θ1 (an emission direction A1) is strongly reflected by the flat portion W1 which is away from the vehicle 100 by a distance L1. The beam emitted from the transmission antenna 17 at the azimuth angle θ2 (an emission direction A2) is strongly reflected by the flat portion W2 which is away from the vehicle 100 by a distance L2. The beam emitted from the transmission antenna 17 in the azimuth angle θ3 (an emission direction A3) is weakly reflected by the flat portion W3. The beam emitted from the transmission antenna 17 in the azimuth angle θ4 (an emission direction A4) is strongly reflected by the flat portion W4 which is away from the vehicle 100 by a distance L4. The beam emitted from the transmission antenna 17 at the azimuth angle θN (an emission direction AN) is strongly reflected by the flat portion WN which is away from the vehicle 100 by a distance LN.

Figure 3:
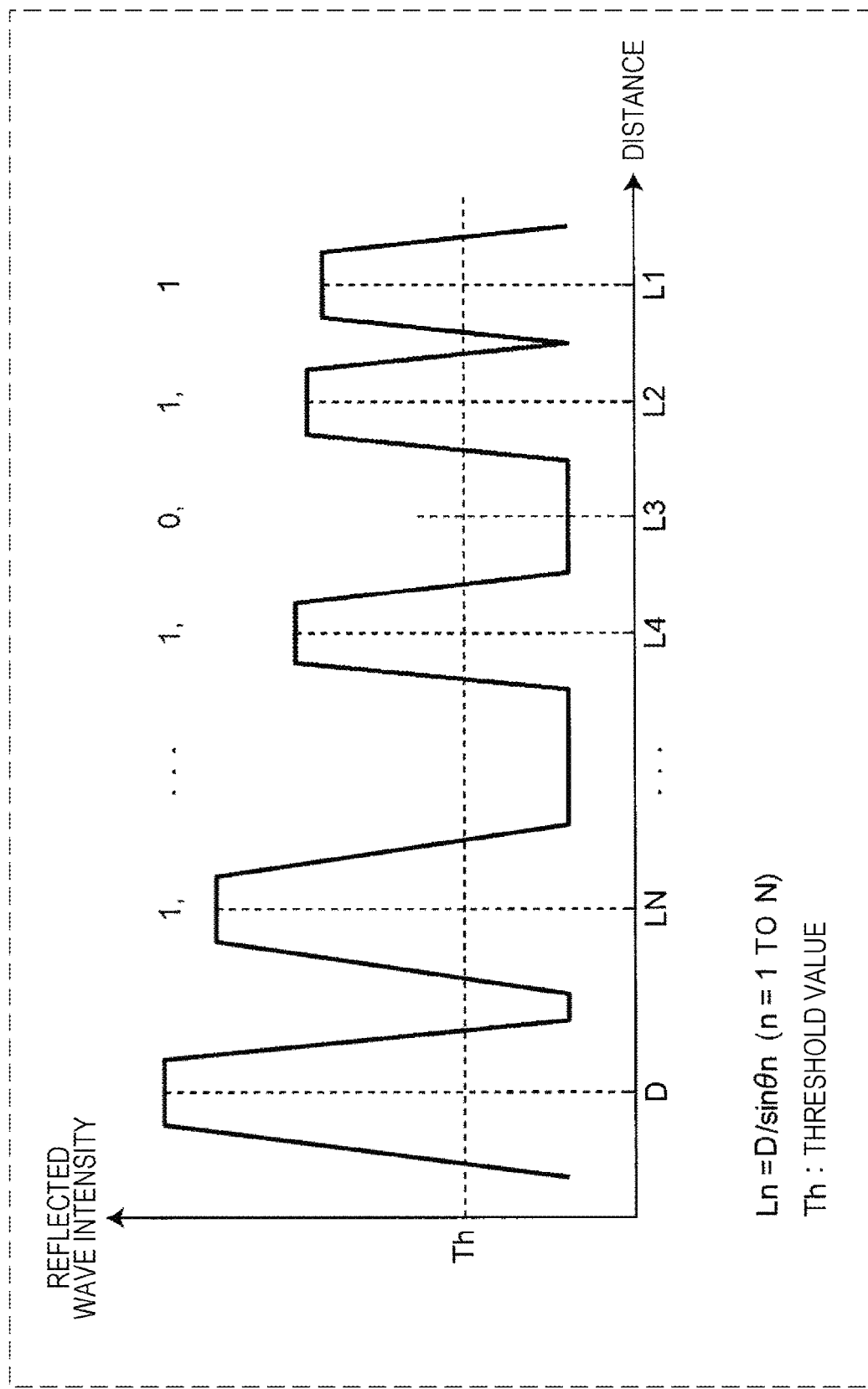
FIG. 3 is a graph illustrating the change in the reflected wave intensity with varying distance from a vehicle to each of the flat portions of the road sign illustrated in FIG. 2 according to the first embodiment of the present disclosure.

FIG. 3 is a graph illustrating the change in the reflected wave intensity with varying distance from the vehicle 100 to each of the flat portions Wn of the road sign illustrated in FIG. 2. The reflected wave intensities at the distances L1, L2, L4, . . . , LN (the flat portions W1, W2, W4, . . . , WN) are higher than or equal to the threshold value Th. In addition, the reflected wave intensity at the distance L3 (the flat portion W3) is lower than the threshold value Th. Note that the reflected wave intensity at the distance D (the flat portion W0) is the highest since the distance from the vehicle 100 to the flat portion is the shortest.

The operation performed by the road information analysis unit 4 is described below. The road information analysis unit 4 generates a heat map on the basis of the azimuth angle detected by the emission angle detection unit 2 and the distance and the reflected wave intensity detected by the distance and reflected wave intensity detection unit 3 and analyzes the generated heat map by using the threshold value of the reflected wave intensity. In this manner, the road information analysis unit 4 acquires the road information. To acquire road information accurately regardless of the traveling position of the vehicle, the distance D at which the reflected wave intensity of the beam emitted at the azimuth angle of 90 degrees is maximized is determined first. Subsequently, the road information analysis unit 4 calculates a distance Ln for each of the azimuth angles θn (n=1, 2, 3, 4, . . . , N) by using the value of the determined distance D and the following equation (2):

$$Ln = D/\sin(\theta n) \quad (2).$$

Subsequently, the road information analysis unit 4 determines whether the reflected wave intensity for each of the distance Ln is higher than or equal to a threshold value Th. If the road information analysis unit 4 determines that the reflected wave intensity is higher than or equal to the threshold value Th, the road information analysis unit 4 generates digital data of "1". However, if the road information analysis unit 4 determines that the reflected wave intensity is lower than the threshold value Th, the road information analysis unit 4 generates digital data of "0".

Figure 4:
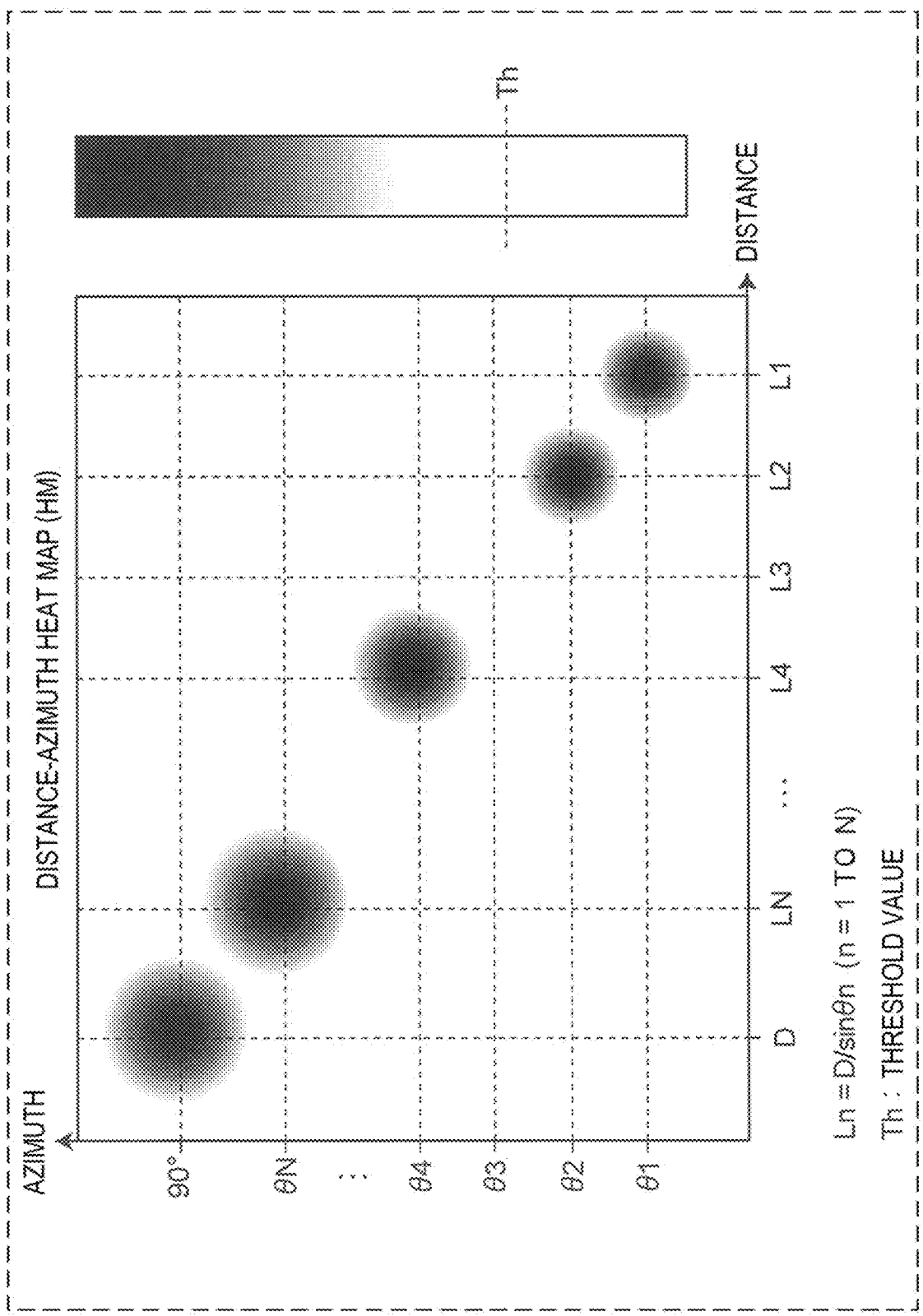
FIG. 4 illustrates an example of a heat map according to the first embodiment of the present disclosure.

FIG. 4 illustrates an example of the heat map according to the first embodiment of the present disclosure. In FIG. 4, the heat map having the abscissa representing the distance Ln and the ordinate representing the azimuth angle is illustrated. The heat map allows the reflected wave intensity to be identified by using the density of a color. Since the reflected wave intensities at the distances L1, L2, L4, . . . , LN (the flat portions W1, W2, W4, . . . , WN) are higher than or equal to the threshold value Th, the road information analysis unit 4 generates digital data of "1". In addition, since the reflected wave intensity for the distance L3 (the flat portion W3) is lower than the threshold value Th, the road information analysis unit 4 generates digital data of "0". Thus, the road information analysis unit 4 generates N-bit digital data of "1101 . . . 1" on the basis of the reflected wave intensities at the distances L1, L2, L3, L4, . . . , LN. Thereafter, the road information analysis unit 4 outputs the road information associated with the generated digital data to the display unit 5. The display unit 5 displays the road information input from the road information analysis unit 4. Note that the threshold value Th can be changed and set to any value. Accordingly, the threshold value Th can be set to an appropriate value.

According to the above-described road information detection apparatus of the first embodiment of the present disclosure, the road information can be acquired with high accuracy regardless of weather conditions and time of day.

In addition, a fixed pattern may be inserted into N-bit digital data in advance. By employing such a configuration, digital data indicating road information can be more appropriately identified.

Second Embodiment

Figure 5:
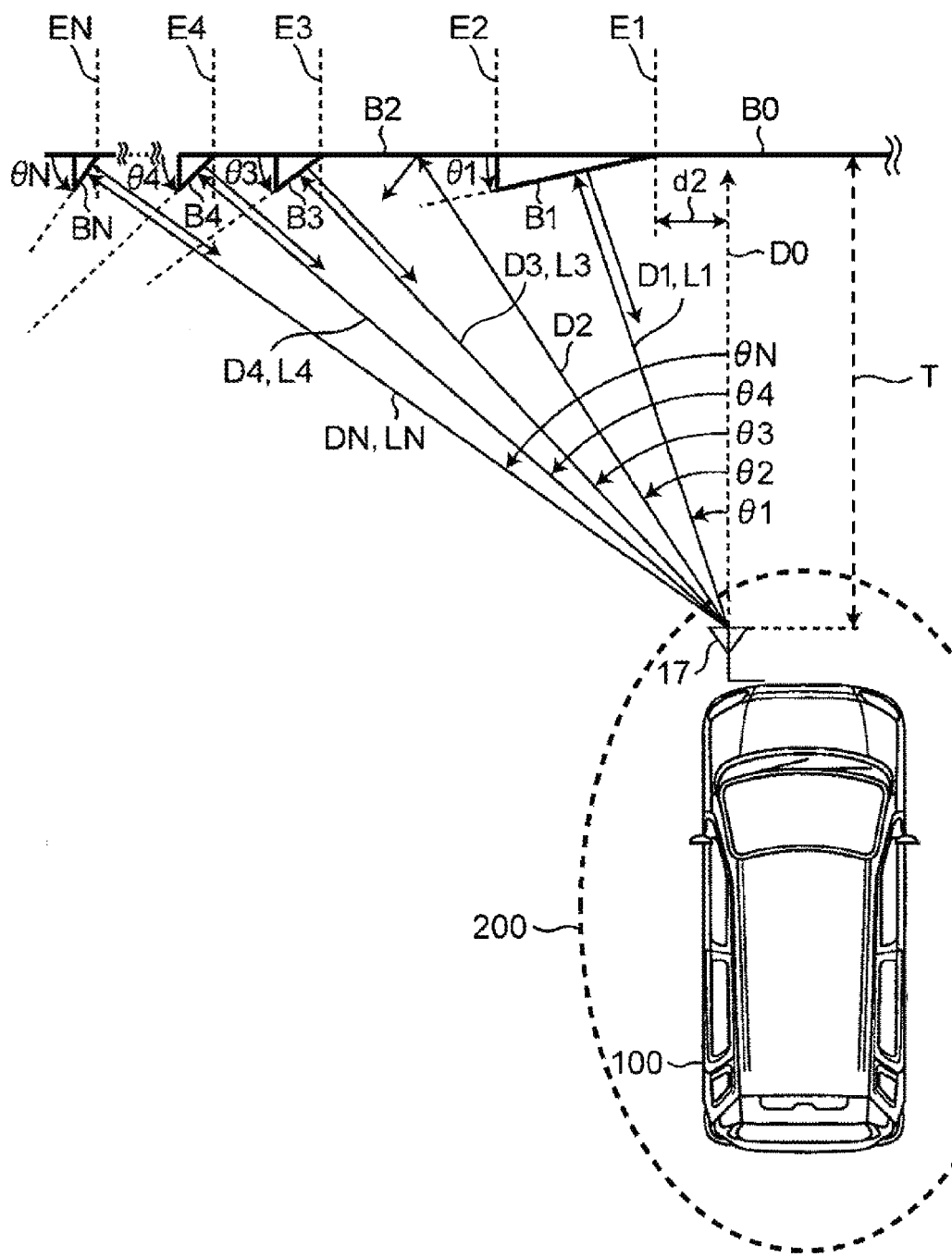
FIG. 5 is a schematic illustration of the operation performed by the road information detection apparatus illustrated in FIG. 1 according to a second embodiment of the present disclosure.

FIG. 5 is a schematic illustration of the operation performed by the road information detection apparatus in FIG. 1 according to the second embodiment of the present disclosure. FIG. 5 illustrates a road sign (a signboard) indicating road information consisting of a plurality (N bits) of digital data. That is, the road sign consists of N flat portions B1 to BN. A flat portion that is perpendicular to a vehicle travel direction D0 is a flat portion B0, and flat portions B1, B2, B3, B4, . . . , BN are formed from the flat portion B0 so as to be arranged in this order in a direction perpendicular to the vehicle travel direction D0 (for example, the left direction in FIG. 5). The interval between the flat portions Bn (n=1, 2, 3, 4, . . . , N) may be zero or a predetermined interval.

When the vehicle 100 scans a beam over the road sign at the measuring position 200, the flat portion B0 is orthogonal to the vehicle travel direction A0. A distance T is the distance from the transmission antenna 17 to the flat portion W0. In addition, imaginary planes En positioned parallel to the vehicle travel direction D0 are arranged parallel to one another at predetermined intervals. The imaginary plane E1 is located at a distance d2 from the transmission antenna 17. Here, between the imaginary plane E1 and the imaginary plane EN, the road sign has N flat portions Bn. In addition, each of the flat portions Bn extends from the intersecting point of the extended line of the flat portion B0 and the imaginary plane En so as to be inclined a predetermined rotation angle in the counterclockwise direction from the flat portion B0. Furthermore, in the case where there is a gap between the flat portions Bn, by providing a connecting portion in the gap, the road sign is integrally formed from the flat portion B1 to the flat portion BN. For example, a connecting portion is provided in a gap between the flat portion B1 and the flat portion B2 and in a gap between the flat portion B3 and the flat portion B4.

The transceiver circuit 1 controls the transmission antenna 17 to emit a beam at angular increments of θd between 0° and 90° relative to the vehicle travel direction D0. That is, the transceiver circuit 1 controls the transmission antenna 17 to emit a beam at an emission angle which includes an azimuth angle θn (n=1, 2, 3, 4, ..., N) which is a rotation angle in the counterclockwise direction from the vehicle travel direction A0. The azimuth angle θn (0 degrees<θn<90 degrees) is calculated by the following equation (3):

$$\theta n = \theta 1 + (n-1) \times \theta d \qquad (3).$$

As illustrated in FIG. 5, the flat portions B1, B3, B4, ..., BN are inclined with respect to the flat portion B0 such that the reflected waves from the flat portions B1, B3, B4, ..., BN are reflected with a reflectance of a predetermined value or greater. For example, the flat portions B1, B3, B4, BN are inclined with respect to the flat portion B0 at angles the same as the azimuth angles θ1, θ3, θ4, ..., θN, respectively, such that the beam emitted from the vehicle 100 is incident on each of the flat portions B1, B3, B4, BN in the normal direction. In contrast, the flat portion B2 is inclined with respect to the flat portion B0 such that the reflected wave from the flat portion B2 is reflected with a reflectance lower than the predetermined value. For example, the flat portion B2 is not inclined with respect to the flat portion B0 (the rotation angle is 0°, so that the beam emitted from the vehicle 100 is incident on the flat portion B2 in a direction other than the normal direction.

An electromagnetic wave reflecting material, such as metal, is formed on the surface of each of the flat portions Bn. If the reflected wave intensity of the beam that is reflected by the flat portion is higher than or equal to the threshold value, the road information analysis unit 4 generates digital data of "1". However, if the reflected wave intensity of the beam that is reflected by the flat portion is lower than the threshold value, the road information analysis unit 4 generates digital data of "0". Here, when the beam emitted from the vehicle 100 is incident on the flat portion in the normal direction, the intensity of the reflected wave reflected by the flat portion is higher than or equal to the threshold value. In contrast, when the beam emitted from the vehicle 100 is incident on the flat portion from a direction other than the normal direction, the intensity of the reflected wave that is reflected by the flat portion is lower than the threshold value.

The beam emitted from the transmission antenna 17 at the azimuth angle θ1 (emission direction D1) is strongly reflected by the flat portion B1 which is away from the vehicle 100 by the distance L1. The beam emitted from the transmission antenna 17 at the azimuth angle θ2 (an emission direction D2) is weakly reflected by the flat portion B2. The beam emitted from the transmission antenna 17 at the azimuth angle θ3 (an emission direction D3) is strongly reflected by the flat portion B3 which is away from the vehicle 100 by the distance L3. The beam emitted from the transmission antenna 17 at the azimuth angle θ4 (an emission direction D4) is strongly reflected by the flat portion B4 which is away from the vehicle 100 by the distance L4. The beam emitted from the transmission antenna 17 at the azimuth angle θN (an emission direction DN) is strongly reflected by the flat portion BN which is away from the vehicle 100 by the distance LN.

Figure 6:
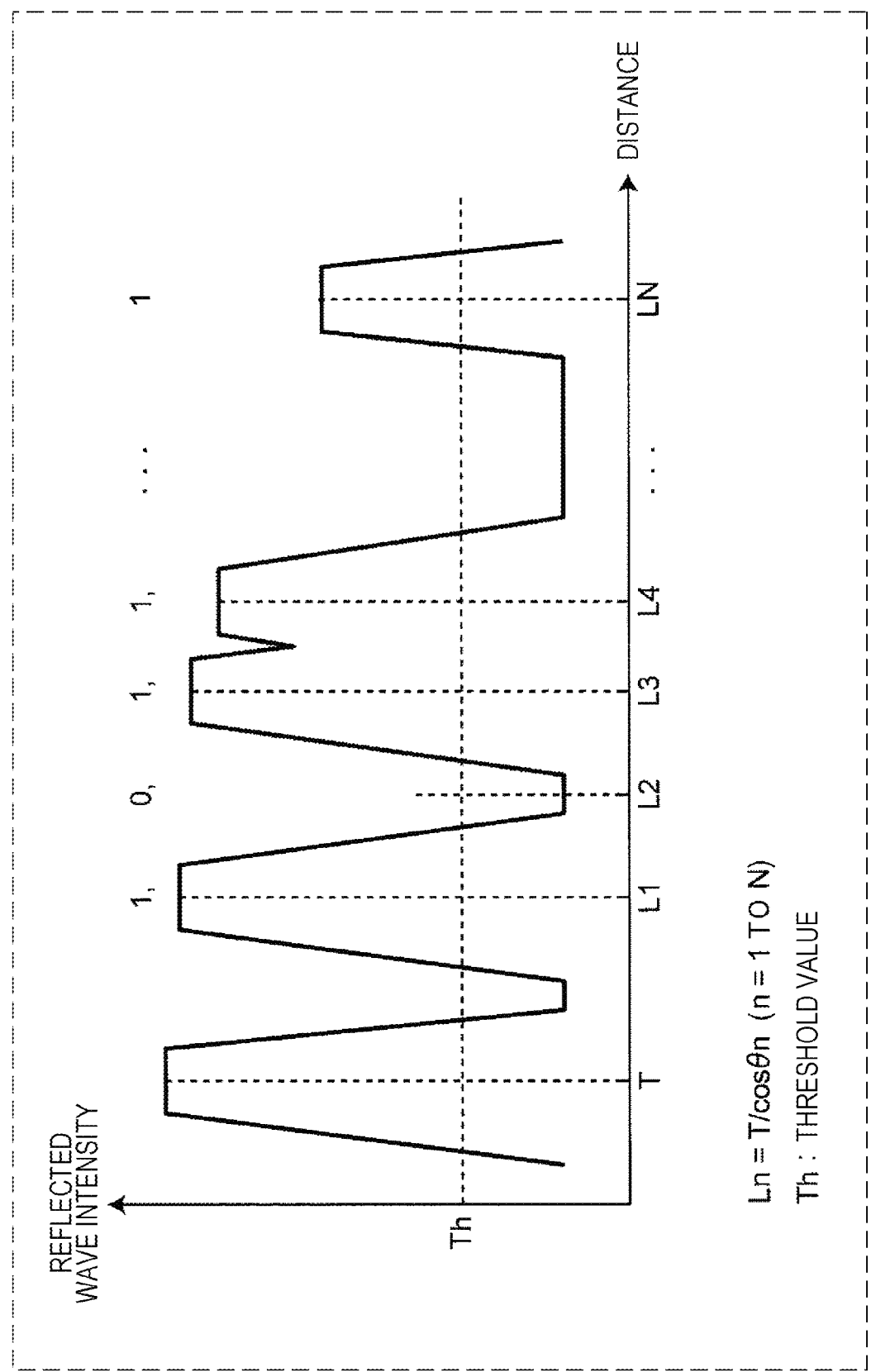
FIG. 6 is a graph illustrating the change in the reflected wave intensity with varying distance between the vehicle and each of the flat portions of the road sign according to the second embodiment of the present disclosure.

FIG. 6 is a graph illustrating the change in the reflected wave intensity with varying distance between the vehicle 100 and each of the flat portions Bn of the road sign in FIG. 5, according to the second embodiment of the present disclosure. The reflected wave intensities at the distances L1, L3, L4, ..., LN (the flat portions B1, B3, W4, ..., BN) are higher than or equal to the threshold value Th. In addition, the reflected wave intensity at the distance L2 (the flat portion B2) is lower than the threshold value Th. The reflected wave intensity at the distance T (the flat portion B0) is maximized since the distance from the vehicle 100 to the flat portion is the shortest.

The operation performed by the road information analysis unit 4 is described below. The road information analysis unit 4 generates a heat map on the basis of the azimuth angle detected by the emission angle detection unit 2 and the distance and the reflected wave intensity detected by the distance and reflected wave intensity detection unit 3 and analyzes the generated heat map by using the threshold value of the reflected wave intensity. Thus, the road information analysis unit 4 acquires the road information. The road information analysis unit 4 determines the distance T at which the reflected wave intensity of the beam emitted at an azimuth angle of 0 degrees is maximized first. Subsequently, the road information analysis unit 4 calculates the distance Ln for each of the azimuth angles θn (n=1, 2, 3, 4, ..., N) by using the determined value of the distance T and the following equation (4):

$$Ln = T/\cos(\theta n) \qquad (4).$$

Subsequently, the road information analysis unit 4 determines whether the reflected wave intensity at each of the distances Ln is higher than or equal to a threshold value Th. If the road information analysis unit 4 determines that the reflected wave intensity is higher than or equal to the threshold value Th, the road information analysis unit 4 generates digital data of "1". However, if the road information analysis unit 4 determines that the reflected wave intensity is lower than the threshold value Th, the road information analysis unit 4 generates digital data of "0".

Figure 7:
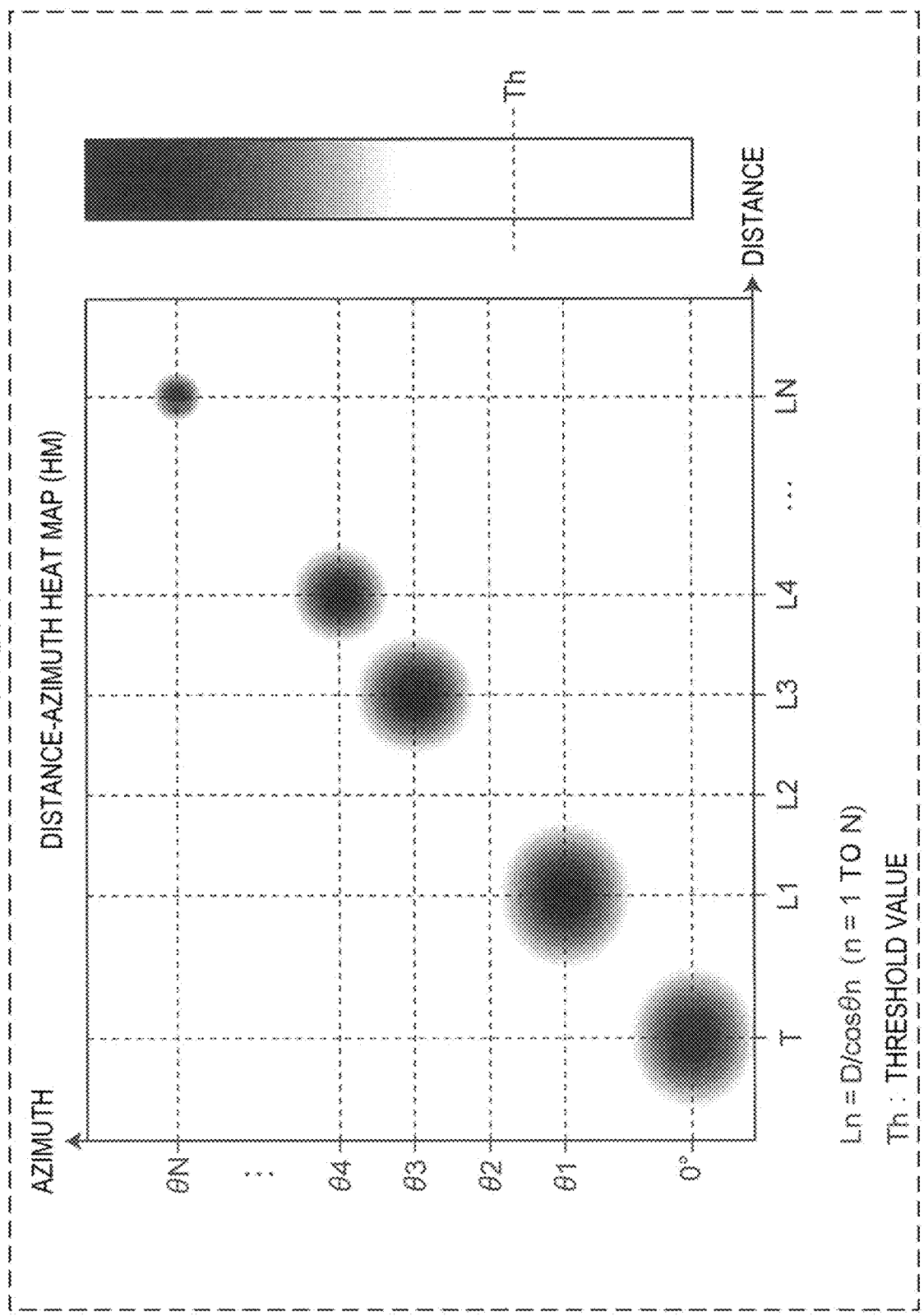
FIG. 7 illustrates an example of a heat map according to the second embodiment of the present disclosure.

FIG. 7 illustrates an example of a heat map according to the second embodiment of the present disclosure. In FIG. 7, the heat map having the abscissa representing the distance Ln and the ordinate representing the azimuth angle is illustrated. Thus, the heat map allows the reflected wave intensity to be identified by using the density of a color. Since the reflected wave intensities at the distances L1, L3, L4, ..., LN (the flat portions B1, B3, B4, ..., BN) are higher than or equal to the threshold value Th, the road information analysis unit 4 generates digital data of "1". In addition, since the reflected wave intensity at the distance L2 (the flat portion B2) is lower than the threshold value Th, the road information analysis unit 4 generates digital data of "0". Thus, the road information analysis unit 4 generates N-bit digital data of "1011 ... 1" on the basis of the reflected wave intensities at the distances L1, L2, L3, L4, ..., LN. Thereafter, the road information analysis unit 4 outputs the road information associated with the generated digital data to the display unit 5. The display unit 5 displays the road information input from the road information analysis unit 4. Note that the threshold value Th can be changed and set to any value. Accordingly, the threshold value Th can be set to an appropriate value.

According to the above-described road information detection apparatus of the second embodiment of the present disclosure, the road information can be acquired with high accuracy regardless of weather conditions and time of day.

In addition, a fixed pattern may be inserted into N-bit digital data in advance. By employing such a configuration, digital data indicating road information can be more appropriately identified.

Third Embodiment

Figure 8:
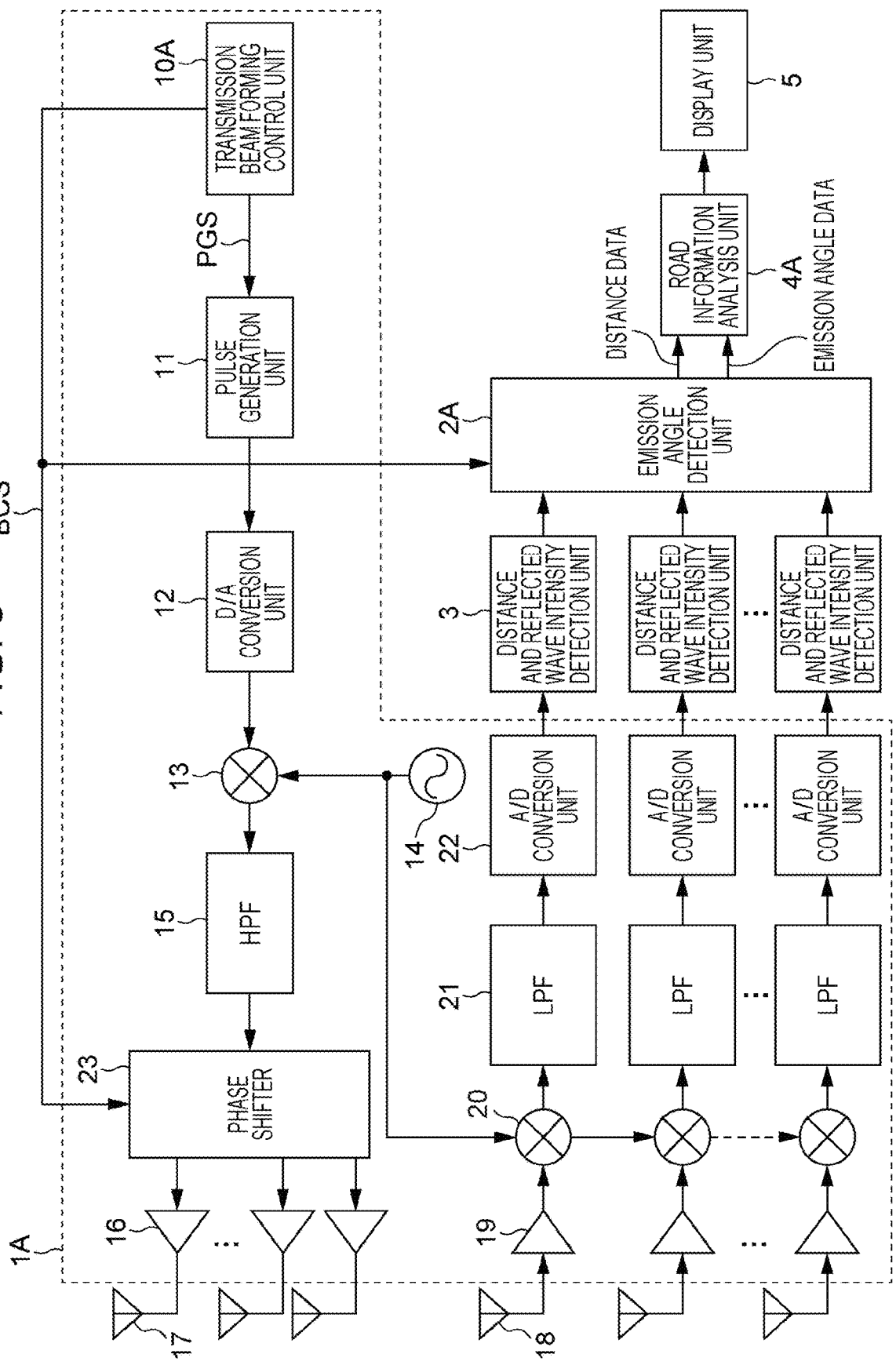
FIG. 8 is a block diagram of an example of the configuration of a road information detection apparatus according to a third embodiment of the present disclosure.

FIG. 8 is a block diagram of an example of the configuration of a road information detection apparatus according to the third embodiment of the present disclosure. Compared with the road information detection apparatus illustrated in FIG. 1, a road information detection apparatus illustrated in FIG. 8 includes a transceiver circuit 1A instead of the transceiver circuit 1, an emission angle detection unit 2A instead of the emission angle detection unit 2, and a road information analysis unit 4A instead of the road information analysis unit 4. Here, the transceiver circuit 1 controls the transmission antenna 17 to scan a beam (a radio signal) to be reflected from a plurality of flat portions by switching the emission angle which includes the azimuth angle relative to the front direction of the vehicle and an elevation angle which is an upward rotation angle relative to the ground on which the vehicle 100 travels. Thereafter, the transceiver circuit 1 receives, as a reflected wave signal, a reflected wave obtained when the beam (the radio signal) is reflected by each of the plurality of flat portions. The emission angle detection unit 2A detects the azimuth angle and the elevation angle. Compared with the transceiver circuit 1 illustrated in FIG. 1, the transceiver circuit 1A illustrated in FIG. 8 includes a transmission beam forming control unit 10A instead of the transmission beam formation control unit 10.

The transmission beam forming control unit 10A controls the transmission antenna 17 to emit a beam at an azimuth angle varying from 0 degrees to 90 degrees relative to the vehicle travel direction in increments of a constant angle θd. In addition, the transmission beam forming control unit 10A controls the transmission antenna 17 to emit a beam at an elevation angle varying from 0 degrees to 90 degrees in increments of a constant angle ϕd. The azimuth angle θi (i=1, 2, 3, 4, ..., N) and the elevation angle ϕj (j=1, 2, 3, 4, ..., M) (0 degrees<θi<90 degrees, and 0 degrees<ϕj<90 degrees) are expressed by the following equation (5):

$$\theta i = \theta 1 + (i-1) \times \theta d$$

$$\phi j = \phi 1 + (j-1) \times \phi d \quad (5).$$

The road information analysis unit 4A generates a heat map on the basis of the azimuth angle and the elevation angle detected by the emission angle detection unit 2A and the distance between the vehicle and each of the flat portions and the reflected wave intensities detected by the distance and reflected wave intensity detection unit 3 and analyzes the generated heat map by using the threshold value of the reflected wave intensity. In this manner, the road information analysis unit 4A acquires the road information.

The operation performed by the road information detection apparatus having the above-described configuration is described below.

Figure 9:
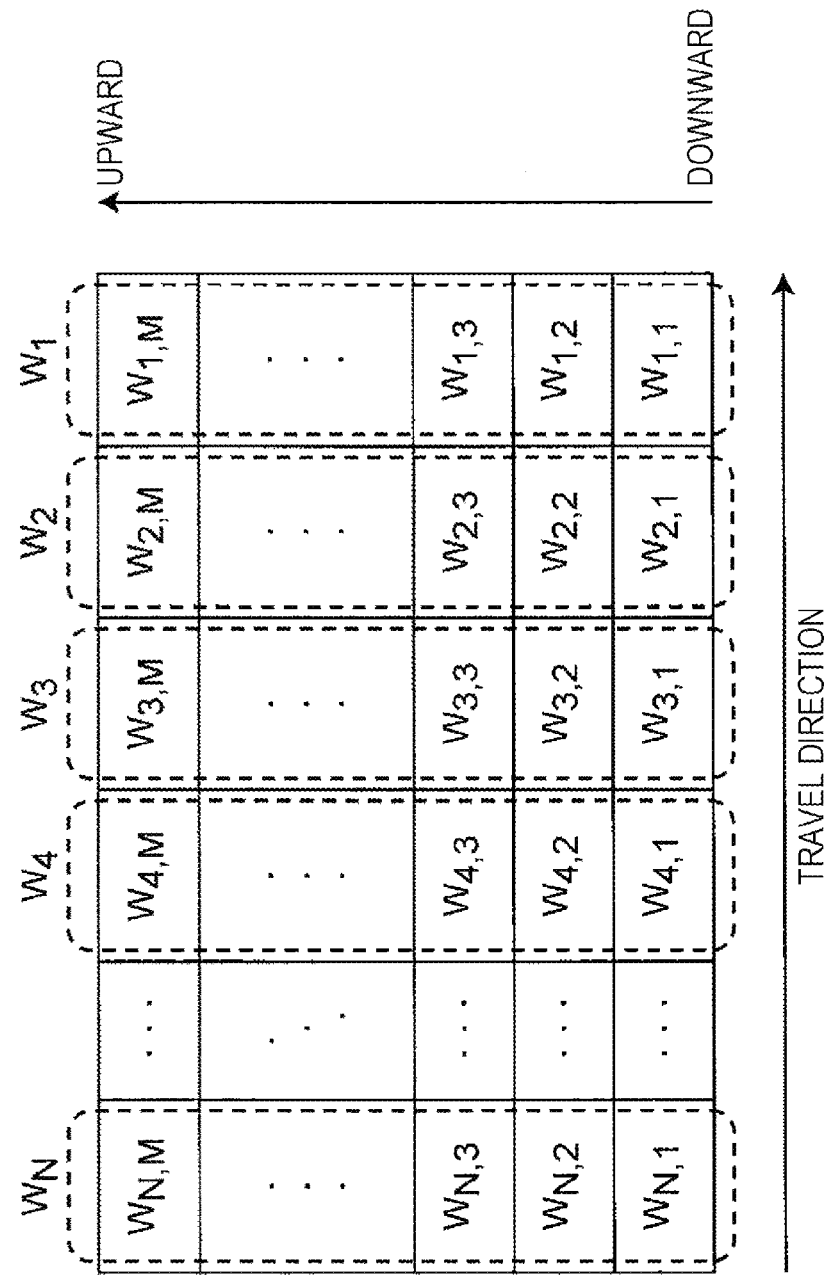
FIG. 9 is a side view of a road sign according to the third embodiment of the present disclosure.

FIG. 9 is a side view of a road sign according to the third embodiment of the present disclosure. Unlike the road sign illustrated in FIG. 2, the road sign illustrated in FIG. 9 further includes a plurality of flat portions (M flat portions) arranged in the vertical direction. That is, the road sign in FIG. 9 has (N×M) flat portions. Accordingly, a road sign indicating road information consisting of (N×M) bits of digital data is illustrated in FIG. 9.

Figure 10:
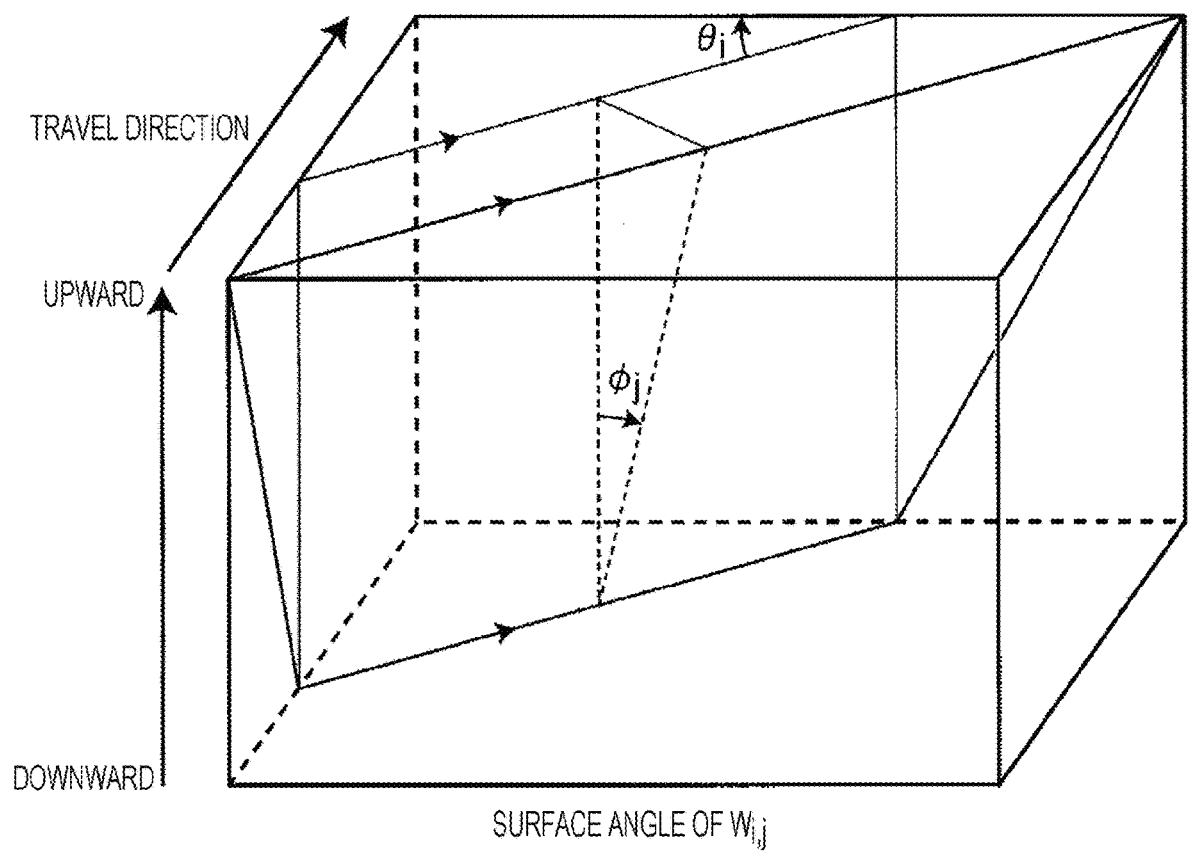
FIG. 10 is a schematic illustration of the surface angle of each of flat portions $W_{i,j}$ illustrated in FIG. 9.

FIG. 10 is a schematic illustration of the surface angle of each of flat portions $W_{i,j}$ illustrated in FIG. 9. As illustrated in FIG. 10, each of the flat portion $W_{i,j}$ is further inclined at an elevation angle $\phi_j$ (j=1, 2, 3, 4, ..., M) in the vertical direction from an oblique plane that is inclined with respect to a plane orthogonal to the vehicle travel direction at an azimuth angle $\theta_i$ (i=1, 2, 3, 4, ..., N).

Figure 11:
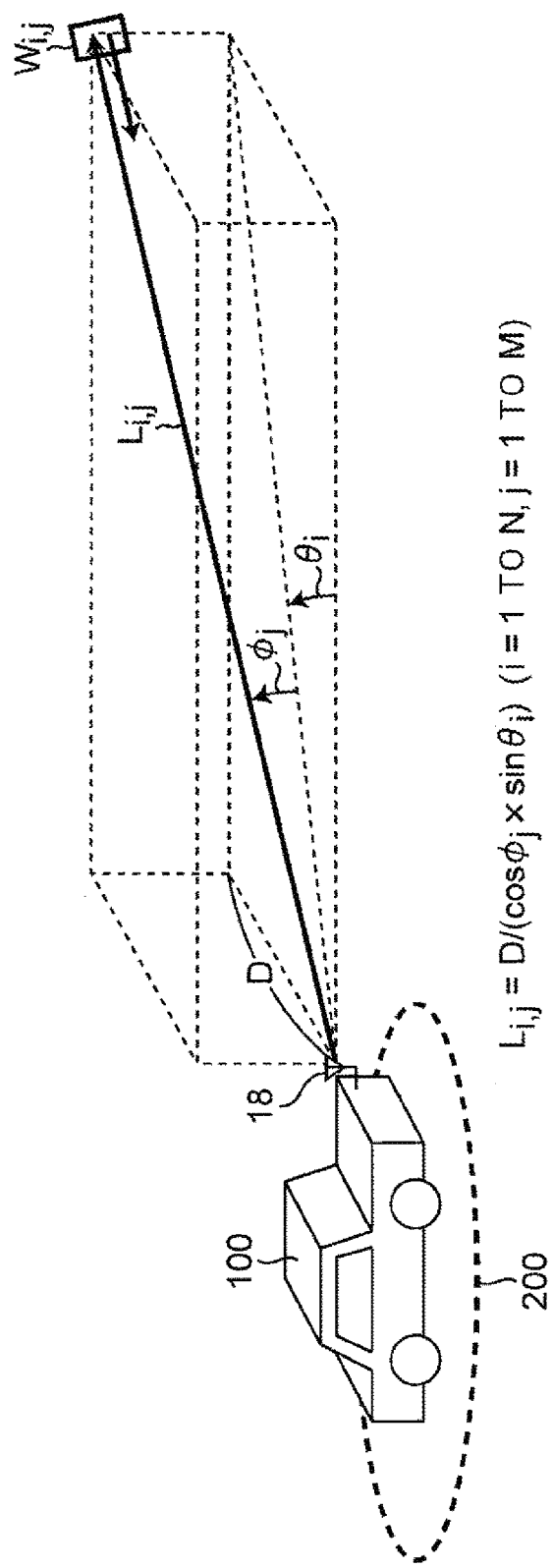
FIG. 11 is a schematic illustration of the operation performed by a road information detection apparatus illustrated in FIG. 8 according to the third embodiment of the present disclosure.

FIG. 11 is a schematic illustration of the operation performed by the road information detection apparatus illustrated in FIG. 8 according to the third embodiment of the present disclosure. Here, when the beam emitted from the transceiver circuit 1A is incident on the road sign illustrated in FIG. 9 at 90 degrees (the normal direction), the reflected wave intensity is maximized.

The operation performed by the road information analysis unit 4A is described below. The road information analysis unit 4A generates a heat map on the basis of the azimuth angle detected by the emission angle detection unit 2 and the distance and the reflected wave intensity detected by the distance and reflected wave intensity detection unit 3 and analyzes the generated heat map by using the threshold value of the reflected wave intensity. Thus, the road information analysis unit 4A acquires the road information. The road information analysis unit 4A determines the distance D at which the reflected wave intensity of the beam emitted at the azimuth angle of 90 degrees and the elevation angle of 0 degrees is maximized first. Subsequently, the road information analysis unit 4A uses the value of the determined distance D to calculate a distance $L_{i,j}$ for each azimuth angle $\theta_i$ (i=1, 2, 3, 4, ..., N) and each elevation angle $\phi_j$ (j=1, 2, 3, 4, ..., M) by using the following equation (6):

$$L_{i,j} = D/(\cos \phi_j \times \sin \theta_i) \quad (6).$$

Subsequently, the road information analysis unit 4A determines whether the reflected wave intensity at each of the distances $L_{i,j}$ is higher than or equal to a threshold value Th. If the road information analysis unit 4A determines that the reflected wave intensity is higher than or equal to the threshold value Th, the road information analysis unit 4A generates digital data of "1". However, if the road information analysis unit 4A determines that the reflected wave intensity is lower than the threshold value Th, the road information analysis unit 4A generates digital data of "0". The road information analysis unit 4A generates (N×M)-bit digital data on the basis of the reflected wave intensity at each of the distances $L_{i,j}$. Thereafter, the road information analysis unit 4A outputs the road information associated with the generated digital data to the display unit 5. The display unit 5 displays the road information input from the road information analysis unit 4A.

According to the road information detection apparatus of the above-described embodiment, road information can be acquired with high accuracy regardless of weather conditions and time of day.

In addition, a fixed pattern may be inserted into (N×M)-bit digital data in advance. By employing such a configuration, the digital data indicating road information can be more appropriately identified.

Modification 1

The design of the above-described road sign (a signboard or a wall) is such that a beam is incident on a flat portion that should strongly reflect the beam (a first flat portion) in a direction normal to the flat portion, and a beam is incident on a flat portion that should not strongly reflect the beam (a second flat portion) in a direction other than the normal direction. Accordingly, the design of the flat portion that should strongly reflect the beam and the design of the flat portion that should not strongly reflect the beam differ from each other. In contrast, according to modification 1, the design of the flat portion that should not strongly reflect the beam is the same as the design of the flat portion that should strongly reflect the beam, and a radio wave absorbent is provided (coated) on the flat portion that does not strongly reflect the beam. The road information detection apparatus according to modification 1 of the embodiment of the present disclosure performs an operation that is the same as the operation performed by the road information detection apparatus according to the above embodiment and can provide the same operation and effect. Furthermore, as compared with the above-described embodiment, according to modification 1, the design is such that all of the flat portions strongly reflect the beams, and a radio wave absorbent is provided (coated) on only the flat portion that should not strongly reflect the beam. As a result, the road information can be easily changed. Thus, according to modification 1, a road information can be changed without requiring a large-scale construction, such as exchanging road signs.

Modification 2

Note that for road signs having flat portions that strongly reflect beams (the first flat portions) and flat portions that do not strongly reflect beams (the second flat portions) that are designed differently (the road signs illustrated in FIGS. 2 and 5), the radio wave absorbent may be provided on some of the flat portions that strongly reflect beams. As a result, the reflected wave intensity of the reflected wave that is reflected by the flat portion that does not strongly reflect the beam (the second flat portion) is lower than the reflected wave intensity of the reflected wave reflected by the flat portion that strongly reflects a beam (the first flat portion) and is higher than the reflected wave intensity of the reflected wave that is reflected by the flat portion having the radio wave absorbent thereon (a third flat portion). Accordingly, by setting the first threshold value used to detect the reflected intensity of the wave reflected by the first flat portion and the second threshold value used to detect the reflected intensity of the wave reflected by the second flat portion, the road sign can indicate the road information consisting of digital data equal in number to the Nth power of 3. As a result, according to modification 2, the amount of road information can be increased without requiring a large-scale construction, such as exchanging road signs.

Modification 3

According to the above-described embodiment, the road sign includes a plurality of flat portions indicating a test pattern, and a failure determination unit is provided downstream of the road information analysis unit 4. If the digital data acquired from the road sign indicating the digital data of the test pattern (for example, "010101") differs from the test pattern, the failure determination unit determines that the road information detection apparatus malfunctions.

Modification 4

According to the above-described embodiment, the road signs include a plurality of flat portions that indicate a regular pattern in accordance with a protocol (a rule), and a failure determination unit 50 is provided downstream of the road information analysis unit 4. If the digital data acquired from the road sign indicating the digital data of the regular pattern in accordance with the protocol differs from the regular pattern, the failure determination unit determines that the road information detection apparatus malfunctions.

As described above, according to a first aspect, a road information detection apparatus acquires road information by emitting a beam via a transmission antenna having a variable directivity pattern from a measuring position to a road sign having a plurality of flat portions. Each of the plurality of flat portions is one of a first flat portion in a direction normal to which the beam from the measuring position is incident and a second flat portion in a direction other than normal to which the beam from the measuring position is incident. The road information detection apparatus includes a transceiver circuit that controls the transmission antenna to scan the beam by switching an emission angle which includes an azimuth angle relative to the front direction of a vehicle and receives, as reflected wave signals, reflected waves produced when the beam is reflected by the plurality of flat portions, a distance and reflected wave intensity detection unit that detects a distance between the vehicle and each of the flat portions and a reflected wave intensity of each of the reflected waves reflected by the flat portions, an emission angle detection unit that detects the emission angle of each of the beams on the basis of the reflected wave signal, and a road information analysis unit that acquires the road information by generating a heat map on the basis of each of the emission angles, each of the distances, and the reflected wave intensity of each of the reflected waves and analyzing the heat map by using a threshold value of the reflected wave intensity.

According to a second aspect, in the road information detection apparatus according to the first aspect, the road information analysis unit generates digital data by analyzing the heat map and acquires road information associated with the digital data.

According to a third aspect, in the road information detection apparatus according to the second aspect, the road information analyzing unit generates digital data of a first value if the reflected wave intensity is higher than or equal to the threshold value and generates digital data of a second value if the reflected wave intensity is lower than the threshold value.

According to a fourth aspect, in the road information detection apparatus according to the first aspect, the transceiver circuit further includes a transmission beam forming control unit that generates a beam control signal used to control the directivity of the transmission antenna, and the transceiver circuit controls the transmission antenna to scan the beam on the basis of the beam control signal.

According to a fifth aspect, in the road information detection apparatus according to the first aspect, the emission angle further includes an elevation angle representing an upward rotation angle relative to the ground on which the vehicle travels.

According to a sixth aspect, in the road information detection apparatus according to the first aspect, a radio wave absorbent is provided on at least one of the plurality of flat portions.

According to a seventh aspect, a road information detection method for use in a road information detection apparatus is provided. The road information detection apparatus acquires road information by emitting a beam via a transmission antenna having a variable directivity pattern from a measuring position to a road sign having a plurality of flat portions, and each of the plurality of flat portions is one of a first flat portion in a direction normal to which the beam from the measuring position is incident and a second flat portion in a direction other than normal to which the beam from the measuring position is incident. The method includes a step of scanning the beam by switching an emission angle which includes an azimuth angle relative to the front direction of a vehicle, a step of receiving, as reflected wave signals, reflected waves produced when the beam is reflected by the plurality of flat portions, a step of detecting a distance between the vehicle and each of the flat portions and a reflected wave intensity of each of the reflected waves reflected by the flat portions, a step of detecting the emission angle of each of the beams on the basis of the reflected wave signal, and a step of acquiring the road information by generating a heat map on the basis of each of the emission angles, each of the distances, and the reflected wave intensity of each of the reflected waves and analyzing the heat map by using a threshold value of the reflected wave intensity.

According to an eighth aspect, in the road information detection method according to a seventh aspect, the step of acquiring of the road information includes generating digital data by analyzing the heat map and acquiring road information associated with the digital data.

According to a ninth aspect, in the road information detection method according to an eighth aspect, the step of acquiring of the road information includes generating digital data of a first value if the reflected wave intensity is higher than or equal to the threshold value and generating digital data of a second value if the reflected wave intensity is lower than the threshold value.

According to a tenth aspect, in the road information detection method according to the seventh aspect, the plurality of flat portions include a plurality of flat portions indicating a test pattern, and the road information detection method further comprises the step of determining whether the road information detection apparatus malfunctions by acquiring the test pattern.

According to an eleventh aspect, in the road information detection method according to the seventh aspect, the plurality of flat portions include a regular pattern in accordance with a protocol, and the road information detection method further comprises the step of determining whether the road information detection apparatus malfunctions by acquiring the regular pattern.

As described in detail above, according to the road information detection apparatus of the present disclosure, road information can be acquired on the basis of the reflected wave intensity of a beam. Accordingly, the road information can be acquired with high accuracy regardless of weather conditions and time of day.

What is claimed is:

1. A road information detection apparatus for acquiring road information by emitting a beam via a transmission antenna having a variable directivity pattern from a measuring position to a road sign having a plurality of flat portions, each of the plurality of flat portions being one of a first flat portion in a direction normal to which the beam from the measuring position is incident and a second flat portion in a direction other than normal to which the beam from the measuring position is incident, the apparatus comprising:
   a transceiver circuit that controls the transmission antenna to scan the beam by switching an emission angle which includes an azimuth angle relative to the front direction of a vehicle and receives, as reflected wave signals, reflected waves produced when the beam is reflected by the plurality of flat portions;
   a distance and reflected wave intensity detector that detects a distance between the vehicle and each of the flat portions and a reflected wave intensity of each of the reflected waves reflected by the flat portions;
   an emission angle detector that detects the emission angle of each of the beams on the basis of the reflected wave signal; and
   a road information analyzer that acquires the road information by generating a heat map on the basis of each of the emission angles, each of the distances, and the reflected wave intensity of each of the reflected waves and analyzing the heat map by using a threshold value of the reflected wave intensity.

2. The road information detection apparatus according to claim 1, wherein the road information analyzer generates digital data by analyzing the heat map and acquires road information associated with the digital data.

3. The road information detection apparatus according to claim 2, wherein the road information analyzer generates digital data of a first value if the reflected wave intensity is higher than or equal to the threshold value and generates digital data of a second value if the reflected wave intensity is lower than the threshold value.

4. The road information detection apparatus according to claim 1, wherein the transceiver circuit includes a transmission beam forming controller that generates a beam control signal used to control the directivity of the transmission antenna, and
   wherein the transceiver circuit controls the transmission antenna to scan the beam on the basis of the beam control signal.

5. The road information detection apparatus according to claim 1, wherein the emission angle further includes an elevation angle representing an upward rotation angle relative to the ground on which the vehicle travels.

6. The road information detection apparatus according to claim 1, wherein a radio wave absorbent is provided on at least one of the plurality of flat portions.

7. A road information detection method for use in a road information detection apparatus that acquires road information by emitting a beam via a transmission antenna having a variable directivity pattern from a measuring position to a road sign having a plurality of flat portions, each of the plurality of flat portions being one of a first flat portion in a direction normal to which the beam from the measuring position is incident and a second flat portion in a direction other than normal to which the beam from the measuring position is incident, the method comprising:
   scanning the beam by switching an emission angle which includes an azimuth angle relative to the front direction of a vehicle;
   receiving, as reflected wave signals, reflected waves produced when the beam is reflected by the plurality of flat portions;
   detecting a distance between the vehicle and each of the flat portions and a reflected wave intensity of each of the reflected waves reflected by the flat portions;
   detecting the emission angle of each of the beams on the basis of the reflected wave signal; and
   acquiring the road information by generating a heat map on the basis of each of the emission angles, each of the distances, and the reflected wave intensity of each of the reflected waves and analyzing the heat map by using a threshold value of the reflected wave intensity.

8. The road information detection method according to claim 7, wherein the acquiring of the road information includes: generating digital data by analyzing the heat map; and acquiring road information associated with the digital data.

9. The road information detection method according to claim 8, wherein the acquiring of the road information includes: generating digital data of a first value if the reflected wave intensity is higher than or equal to the threshold value; and generating digital data of a second value if the reflected wave intensity is lower than the threshold value.

10. The road information detection method according to claim 7, wherein the plurality of flat portions include a plurality of flat portions indicating a test pattern, and wherein the road information detection method further comprises determining whether the road information detection apparatus malfunctions by acquiring the test pattern.

11. The road information detection method according to claim 7, wherein the plurality of flat portions include a regular pattern in accordance with a protocol, and wherein the road information detection method further comprises determining whether the road information detection apparatus malfunctions by acquiring the regular pattern.

* * * * *